Feb. 1, 1938. W. J. WALKER ET AL 2,107,225
LUBRICATOR FOR AIR LINES, ROCK DRILLS, AND OTHER COMMPRESSED AIR APPARATUS
Filed May 11, 1937
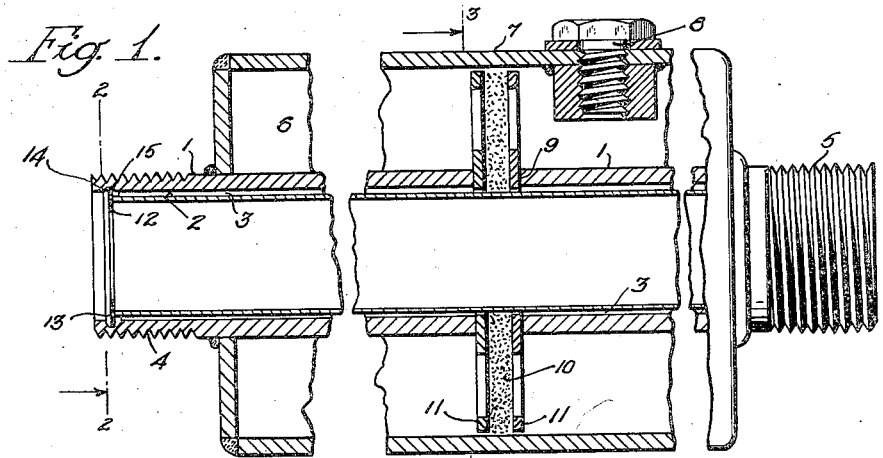
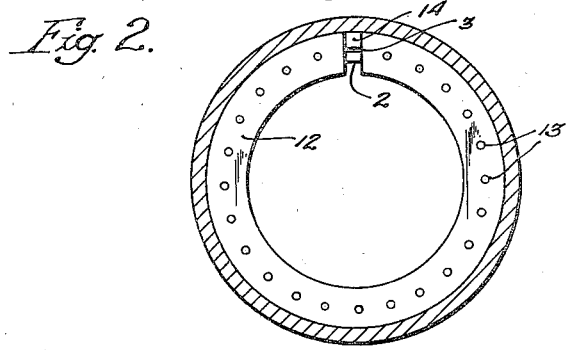
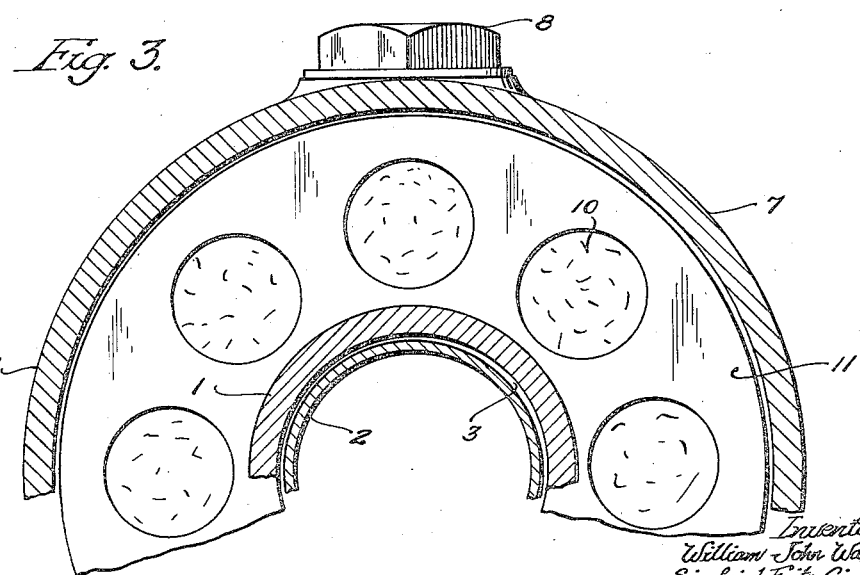

Patented Feb. 1, 1938

2,107,225

UNITED STATES PATENT OFFICE 2,107,225

LUBRICATOR FOR AIR LINES, ROCK DRILLS, AND OTHER COMPRESSED AIR APPARATUS

William John Walker and Siegfried Fritz Gimkey, Johannesburg, Transvaal, Union of South Africa, assignors to Broom and Wade Limited, High Wycombe, Buckinghamshire, England Application May 11, 1937, Serial No. 142,028
In Union of South Africa April 8, 1936

10 Claims. (Cl. 184—55)

This invention relates to lubricators for air lines, rock drills and other compressed air apparatus.

The object of the invention is to provide a lubricator for compressed air lines and apparatus which will be capable of feeding lubricant continuously at a steady rate, and permit wide variation in such rate in a simple and effective manner, and which can be placed in the air line without reference to the direction of air flow. It is also within the object of the invention to provide a lubricator in which there will be no tendency (or practically no tendency) for the lubricant to "weep", i. e., to drip into the air line when the latter is not under pressure, and which though portable, and irrespective of its position or inclination, will operate without any tendency towards spilling of the lubricant, or choking. At the same time, it is the purpose of the invention to provide a lubricator for compressed air lines or apparatus which will be inexpensive to manufacture.

According to the invention, the lubricator comprises the combination, with a reservoir, of means having an annular or other capillary passage which is supplied with lubricant from said reservoir, and means whereby the compressed air stream is utilized to maintain a predetermined flow of lubricant through said capillary passage into the air line or equivalent.

More specifically, the invention comprises concentric tubes or other members adapted to provide an annular or other capillary passage or passages, and means whereby the said tubes or members are so constructed and arranged in relation to the air line or equivalent that lubricant entering the said passage or passages from a reservoir is exposed to a differential pressure action, whereby a steady unidirectional flow of lubricant along the passage or passages into the air stream is maintained.

An air line lubricator embodying the invention will now be described, by way of example, with reference to the annexed drawing, in which:

Fig. 1 is a side elevation of the lubricator, partly in section;

Fig. 2 is an enlarged cross-sectional view of the concentric tubing of the lubricator taken in the plane of the line II—II (Fig. 1);

Fig. 3 is a fragmentary cross-sectional view of the lubricator taken in the plane of the line III—III (Fig. 1).

Referring to the drawing:

The lubricator comprises concentric tubes 1, 2, between which is constituted an annular capillary passage 3. The outer tube 1 is externally screw-threaded at the ends 4, 5, so as to be readily coupled into an air line. A reservoir 6 is constituted within a cylindrical casing 7 which is welded or otherwise secured coaxially on the tube 1. A screw or other cap 8 is provided on the casing 7 for filling purposes.

In a gap 9 in the outer tube 1, a cotton or other absorbent pad 10 is provided, being held between a pair of apertured washers 11. This pad serves to convey lubricant in a steady manner to the middle zone of the capillary passage 3. Split rings 12 having apertures 13 partially close the ends of the passage 3, these rings being sprung into grooves 14 at the opposite ends of the tube 1.

The inner tube 2 (the walls of which may be resilient) is capable of endwise oscillating movement within the outer tube 1, the extent of such movement being determined by the split rings 12 or other suitable end stops. With this arrangement, as the pressure in the air line pulsates (as occurs during the operation of rock drills and like compressed air machines) the inner tube 1 will oscillate similarly in relation to the outer tube 2, and assist in the transfer of lubricant into the air stream.

In order to ensure more effective action of the air on the lubricant at the ends of the capillary space 3, these ends may be chamfered or widened as at 15.

The concentric tubes 1, 2, are so made that the capillary action in the annular passage 3 is insufficient in itself to feed the lubricant at the requisite rate into the air streams. To secure this result, the compressed air in the line is utilized. This air exerts an aspirating or suction effect at the downstream end of the passage 3, and a positive pressure effect at the upstream end. In each case, the extent of the effect—and, consequently, the differential pressure action within the passage—is dependent on the size of the apertures 13 in the end rings 12. In any event, the lubricant entering the passage 3 becomes subject to the action of the capillary force and differential pressure aforesaid, and thus flows towards the downstream end of the passage, where it passes through the apertures 13 and is carried off into the line.

It will be appreciated that, with this arrangement, due to the capillary attraction, there is no tendency (or practically no tendency), when the line is not under pressure, for "weeping" of the lubricator to occur, i. e., for lubricant to drip from the concentric tubes into the line. Moreover, irrespective of the position of the lubricator, the capillary attraction prevents spilling of the lubricant.

For the purpose of altering the speed at which the lubricant is fed into the line, the amount of opening at the upstream and downstream ends of the passage 3 may be varied. For example, pairs of split rings for the ends of the tube 1 may be provided for interchange with the rings 12 illustrated, these additional rings being similarly dimensioned to the rings 12 but having differently sized apertures 13. Alternatively, a series of interchangeable inner tubes 2 of different external diameter may be provided, any of which may be inserted at will inside the outer tube 1. This latter proposal has the drawback, however, that the width of the capillary passage is limited in one direction by the desirability of avoiding any tendency of the lubricator to "weep", or the lubricant to spill.

It will be apparent from the foregoing that our lubricator dispenses entirely with the use of any complicated feed means, and that, once the parts are assembled, there are no adjustments to be made or tampered with. In addition, all the parts are robust and there is no difficulty in use through the lubricator not being operative except in one direction of the air flow.

As a precaution against "weeping" or spilling of the lubricant, circumferential grooves to catch any leakage may be provided in one or both of the tubes.

Liability of the lubricator to become choked is eliminated or reduced by the provision of a large oil flow area by the capillary annulus. In any event, the ready removability of the inner tube (e. g., by simply springing one of the end rings out of its groove) enables any clogging of the annulus to be quickly remedied. In general, however, steady and continuous operation of the lubricator can be secured by employing an inner tube and end rings suited, as regards capillary passage and air openings, to the nature of the oil, and the prevailing temperature and air pressure conditions.

Lubricators for air lines, rock drills and other compressed air apparatus are already known in which lubricant in a reservoir is subjected to the pressure of air drawn from an air line, and is thereby caused to flow through a pipe or channels into the air stream. In these cases, however, the pipe or channels are not made so as to serve as capillary passages. As a consequence, the lubricant feed takes place solely as a result of the pressure of the air, and "weeping" and spilling of the lubricant are unavoidable.

We claim:—

1. A lubricator for use in connection with compressed air apparatus comprising the combination, with a lubricant reservoir, of means adapted to provide a capillary passage, means for supplying lubricant from said reservoir to said passage, and means for directing a portion of the compressed air for said apparatus into said passage to maintain a predetermined flow of lubricant through said capillary passage into the air stream.

2. A lubricator for air lines, rock drills and other compressed air apparatus comprising a lubricant reservoir, spaced, concentric members adapted to provide a capillary passage therebetween, means for feeding lubricant from said reservoir to said passage, and means whereby said passage is exposed to differential pressure action prevailing in the air stream, so as to maintain a steady flow of lubricant along said passage into said stream.

3. A lubricator for use in connection with compressed air apparatus comprising a lubricant reservoir, spaced, concentric tubes adapted to provide a capillary passage therebetween, conduit means for feeding lubricant from said reservoir to said passage, and means whereby said passage is exposed to differential pressure action prevailing in the air stream, so as to maintain a steady flow of lubricant along said passage into said stream.

4. A lubricator for use in connection with pulsating compressed air apparatus, as claimed in claim 2, comprising means whereby the concentric members are relatively movable so that, as the pressure in the air stream pulsates the surfaces bounding the capillary passage will oscillate similarly and assist in the transfer of lubricant into the air stream.

5. A lubricator for use in connection with pulsating compressed air apparatus, as claimed in claim 3, wherein one of the concentric tubes is resilient, so that, as the pressure in the air stream pulsates, the surface of such tube enclosing the capillary passage will vibrate similarly and assist in the transfer of lubricant into the air stream.

6. A lubricator, as claimed in claim 3, comprising rings with axial apertures through their faces, and means whereby said rings are mounted at the ends of the capillary passage, so as partially to close the same.

7. A lubricator for air lines, rock drills and other pulsating compressed air apparatus comprising a lubricant reservoir, outer and inner concentric tubes adapted to provide a capillary passage therebetween, conduit means for feeding lubricant from said reservoir to said passage, means whereby said passage is exposed to differential pressure action prevailing in the air stream so as to maintain lubricant flow along said passage into said stream, means for supporting said inner tube for endwise oscillation within said outer tube under the pulsating action of said stream, and end stops for limiting the extent of oscillation of said inner tube.

8. A lubricator, as claimed in claim 3, comprising absorbent means adapted to convey lubricant from said reservoir to the capillary passage.

9. A lubricator, as claimed in claim 2, comprising a reservoir constituted by a cylindrical casing adapted to surround the concentric members, and means for securing said casing coaxially upon the outermost of said members.

10. A lubricator for air lines, rock drills and other compressed air apparatus comprising a lubricant reservoir, an outer tube and an inner resilient concentric tube adapted to provide between them a capillary passage, screw means on the ends of said outer tube, conduit means whereby lubricant from said reservoir may enter said passage, means whereby the compressed air for said apparatus is utilized to maintain a predetermined flow of lubricant through said passage into the air stream, and means whereby said inner tube can oscillate endwise and vibrate within said outer tube under the pulsating action of said stream, so as to assist in the transfer of lubricant into said stream.

WILLIAM JOHN WALKER.
SIEGFRIED FRITZ GIMKEY.